(12) United States Patent
Shah

(10) Patent No.: US 9,266,550 B1
(45) Date of Patent: Feb. 23, 2016

(54) HANDLE FOR STROLLER

(71) Applicant: Vipul Shah, Matthews, NC (US)

(72) Inventor: Vipul Shah, Matthews, NC (US)

( * ) Notice: Subject to any disclaimer, the term of this patent is extended or adjusted under 35 U.S.C. 154(b) by 0 days.

(21) Appl. No.: 14/475,862

(22) Filed: Sep. 3, 2014

(51) Int. Cl.
*A45F 5/10* (2006.01)
*B62B 7/00* (2006.01)
*B62B 9/20* (2006.01)
*B62B 7/08* (2006.01)

(52) U.S. Cl.
CPC .. *B62B 9/20* (2013.01); *B62B 7/083* (2013.01)

(58) Field of Classification Search
CPC .......... B62B 5/06; B62B 5/061; B62B 5/064; B62B 5/066; B62B 5/067; B62B 9/20; B62B 9/203; B62B 3/02; B62B 3/022; B62B 3/027; B62B 2205/20; A45C 13/262; Y10T 16/469; Y10T 16/473; Y10T 16/498; Y10T 16/429; Y10T 16/427
See application file for complete search history.

(56) References Cited

U.S. PATENT DOCUMENTS

| | | | |
|---|---|---|---|
| 4,216,974 A | 8/1980 | Kassai | |
| 4,270,239 A * | 6/1981 | Gross | 16/438 |
| 4,272,100 A | 6/1981 | Kassai | |
| 4,386,790 A * | 6/1983 | Kassai | 280/650 |
| 5,290,055 A * | 3/1994 | Treat, Jr. | 280/304.1 |
| 5,535,483 A | 7/1996 | Cabagnero | |
| 5,738,410 A | 4/1998 | Stroud et al. | |
| 5,863,061 A | 1/1999 | Ziegler et al. | |
| 6,098,492 A * | 8/2000 | Juchniewicz et al. | 74/551.3 |
| 6,101,678 A * | 8/2000 | Malloy et al. | 16/438 |
| 6,182,529 B1 * | 2/2001 | White | 74/551.1 |
| 6,322,098 B1 * | 11/2001 | Lan | 280/642 |
| 6,371,873 B1 * | 4/2002 | Wang | 473/478 |
| 6,843,499 B2 | 1/2005 | Guo | |
| 7,140,634 B2 | 11/2006 | Kassai et al. | |
| 7,311,323 B1 * | 12/2007 | Lan | 280/642 |
| 7,562,895 B2 | 7/2009 | Santamaria | |
| 8,186,706 B2 * | 5/2012 | Dotsey | 280/647 |
| 2003/0229966 A1 * | 12/2003 | Boice | 16/110.1 |
| 2005/0211011 A1 * | 9/2005 | Victor et al. | 74/551.1 |
| 2012/0104712 A1 * | 5/2012 | Kobayashi | 280/47.38 |

FOREIGN PATENT DOCUMENTS

CA 2311732 A1 * 12/2001

* cited by examiner

*Primary Examiner* — Chuck Mah
(74) *Attorney, Agent, or Firm* — Hammer & Associates, P.C.

(57) ABSTRACT

A handle for a foldable stroller having a pair of stroller handles includes a foldable bar with lateral ends. A clamp for engaging one stroller handle is located at each lateral end. A pair of outer members is included in the foldable bar, and each outer member is pivotally coupled to one clamp. A pair of inner members is included in the foldable bar, and each inner member is pivotally engaged to the other inner member and pivotally engaged with one outer member. A lock is disposed at the pivotal coupling between the inner members. When the lock is disengaged, the stroller may be freely moved between a collapsed position and an open position; but when the lock is engaged, the stroller is fixed in the open position.

16 Claims, 7 Drawing Sheets

HANDLE FOR STROLLER

FIELD OF THE INVENTION

The instant invention is directed to a handle for a stroller, the handle is collapsible and may be permanently or removably affixed to the stroller.

BACKGROUND OF THE INVENTION

Collapsible or foldable strollers (e.g., 'umbrella strollers) typically have two stroller handles. These handles are used to move the stroller (forward and back) and maneuver the stroller (side-to-side, left or right). To efficiently control these stroller movements, it typically requires that both handles be engaged. If only one handle is engaged, control of the stroller is hindered. Oftentimes, for example, while traveling through an airport, a parent is juggling carry-on luggage, perhaps another child, and the stroller, and two hands for the stroller handles is difficult. The collapsible stroller is good for travel, but it could be improved, so that it would only need a single hand for controlling the stroller's movement.

The prior art teaches several collapsible handles, for example see the following:

U.S. Pat. No. 4,216,974 shows, see FIG. 2 (also see FIG. 12), push rod connecting links 213 are pivotally affixed to push rods 205, paragraph bridging columns 3-4. Links 213 are connected by wires 215/216 to front legs 201 and rear legs 203. Operation of grip 214 and pedal 212 facilitates opening and closing of the stroller, first full paragraph column 6.

U.S. Pat. No. 4,272,100 shows, see FIGS. 1-3, a foldable cross connecting rod 4. This push bar is pivotally affixed to push rods 5. This rod consists of two members.

U.S. Pat. No. 5,738,410 shows a three wheeled stroller with a push bar. The push bar is affixed to the stroller frame, and has two members.

U.S. Pat. No. 5,863,061 shows, see FIG. 6, a three wheeled stroller with a push bar. The push bar is pivotally affixed to frame 22, compare FIG. 8. The push bar has two members 48/52 interconnected by a lock assembly 54, first paragraph column 5.

U.S. Pat. No. 8,186,706 shows, see FIGS. 1, 4, 8, 11, 18, 22, & 31, a cross bar 90 that is pivotally affixed to upper ends 84. Bar 90 has three members, sections 94a/b and actuator 92, second & third full paragraphs, column 7.

Accordingly, there is a need for a handle for a foldable (or collapsible) stroller that not only allows a single hand to control the movement of the stroller, but also collapses and opens with the stroller.

SUMMARY OF THE INVENTION

A handle for a foldable stroller having a pair of stroller handles includes a foldable bar with lateral ends. A clamp for engaging one stroller handle is located at each lateral end. A pair of outer members is included in the foldable bar, and each outer member is pivotally coupled to one clamp. A pair of inner members is included in the foldable bar, and each inner member is pivotally engaged to the other inner member and pivotally engaged with one outer member. A lock is disposed at the pivotal coupling between the inner members. When the lock is disengaged, the stroller may be freely moved between a collapsed position and an open position; but when the lock is engaged, the stroller is fixed in the open position.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
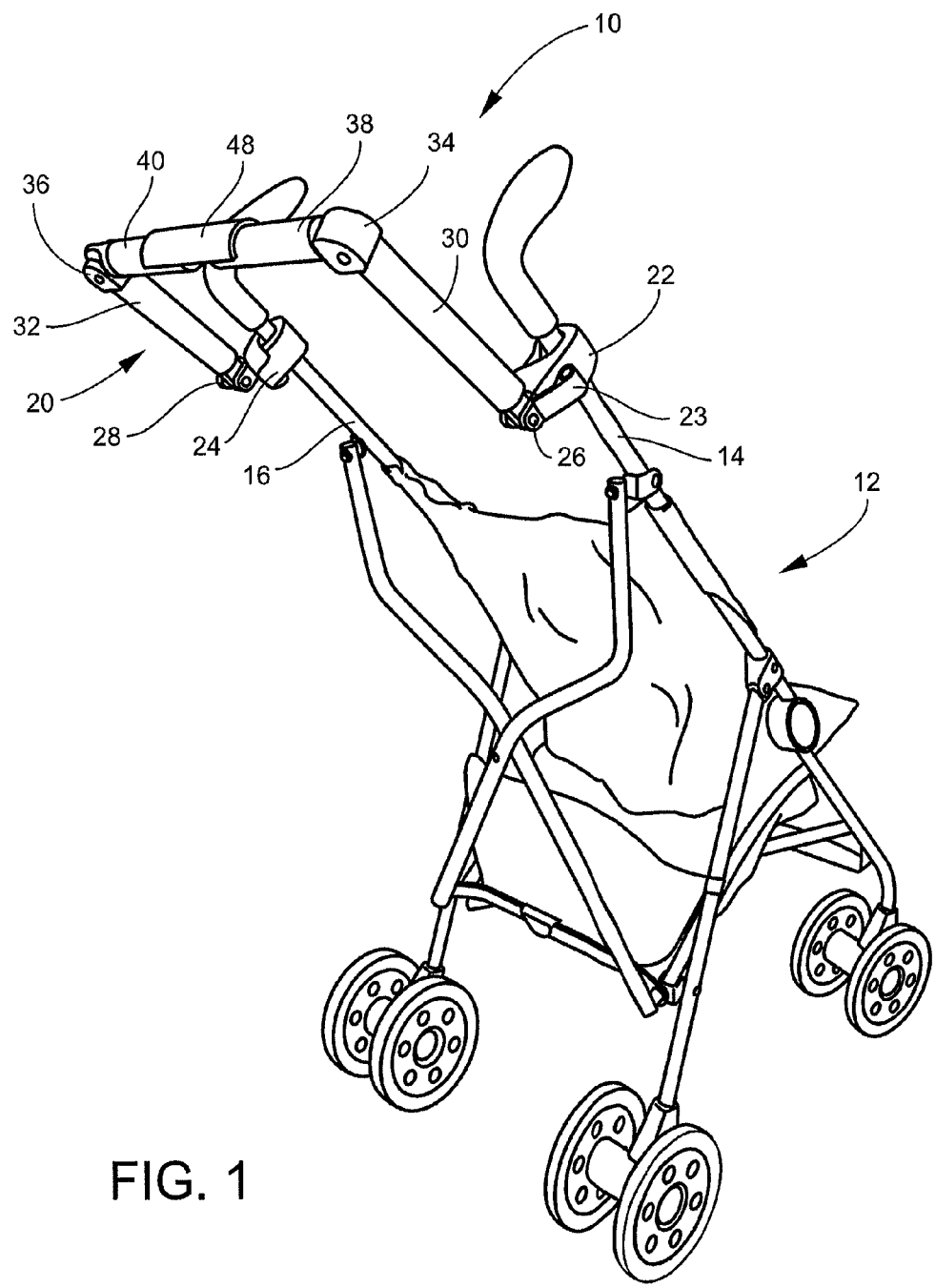
FIG. 1 is an environmental view of a first embodiment of the inventive handle attached to a stroller in an open position.
Figure 2:
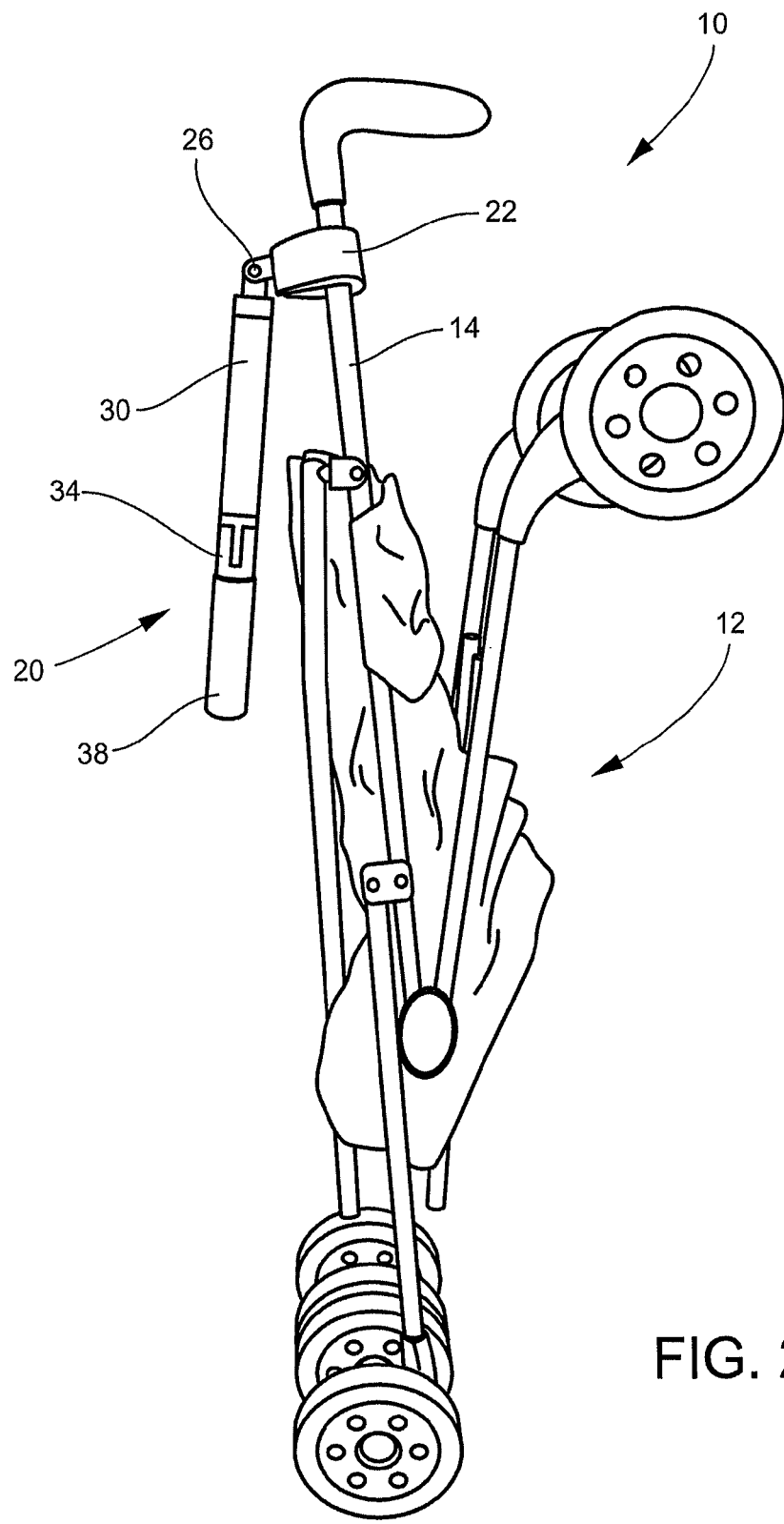
FIG. 2 is a side view of the first embodiment of the inventive handle, folded down, attached to the stroller in the collapsed position.

Referring to the drawings, wherein like numerals indicate like elements, there is shown in FIG. 1 a stroller with a handle 10 (e.g., 'umbrella' stroller). The stroller 12 may be any collapsible stroller. The stroller 12 has two stroller handles 14/16. The handle 20 is affixed to the to the stroller handles 14/16. In FIG. 1, the stroller 12 is shown in an open position, and the handle 20 is shown in an open (or in-use or up) position. In FIG. 2, the stroller 12 is shown in a collapsed position, and the handle 20 is shown in a stored (or closed or down) position.

The handle 20 may be permanently or removably affixed to the stroller handles 14/16. The handle 20 may be permanently secured to the stroller handles 14/16 in any conventional manner. The handle 20 may be removeably secured to the stroller handles in any conventional manner. One method of removeably securing the handle 20 to the stroller 12 is discussed in greater detail below. When the handle 20 is permanently secured to the stroller, it may be supplied with the stroller by the stroller manufacturer. When the handle 20 is removeably secured to the stroller, it may be provide as an aftermarket kit.

Figure 3:
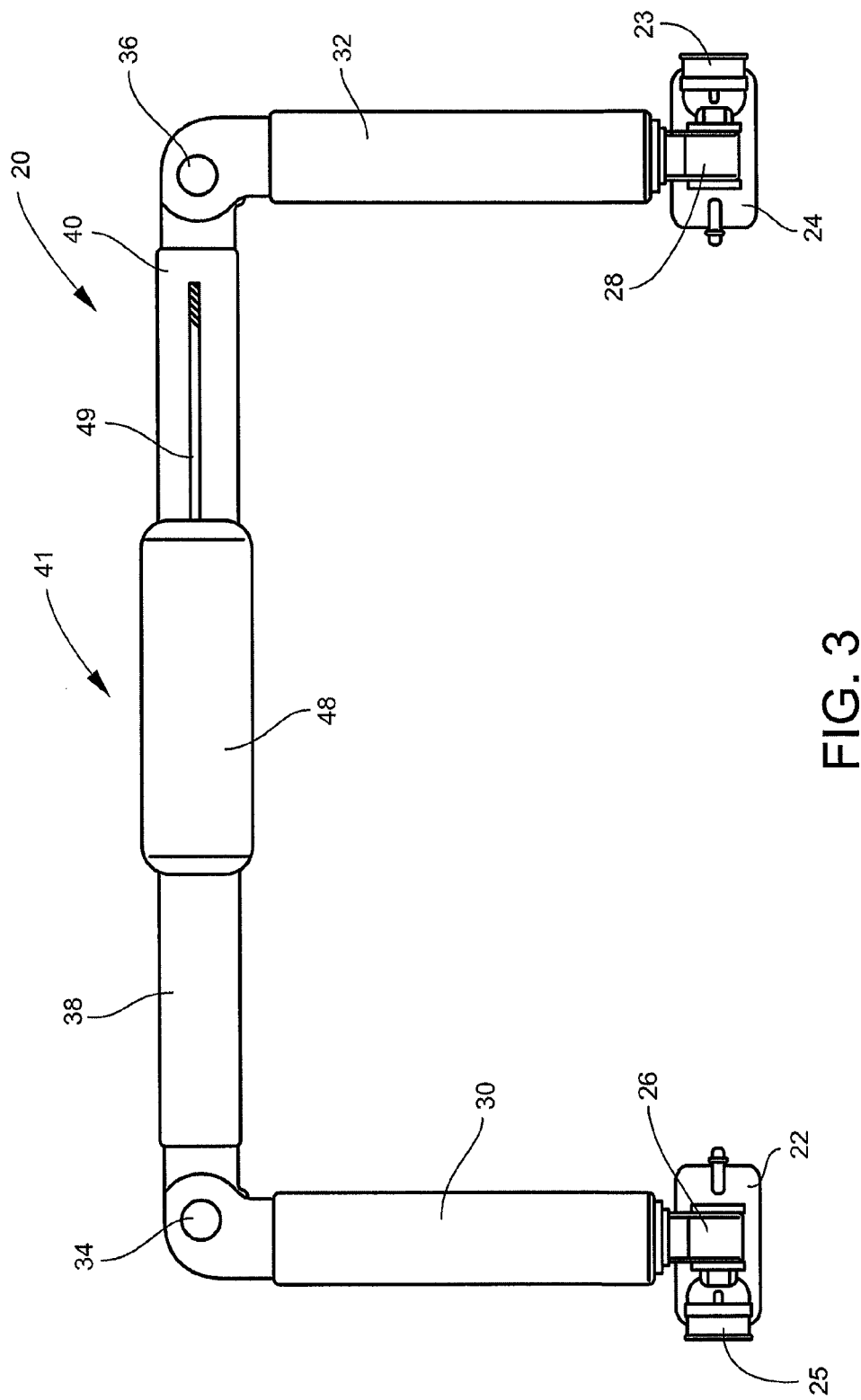
FIG. 3 is a top view of the first embodiment of the inventive handle, in a locked and open position.
Figure 4:
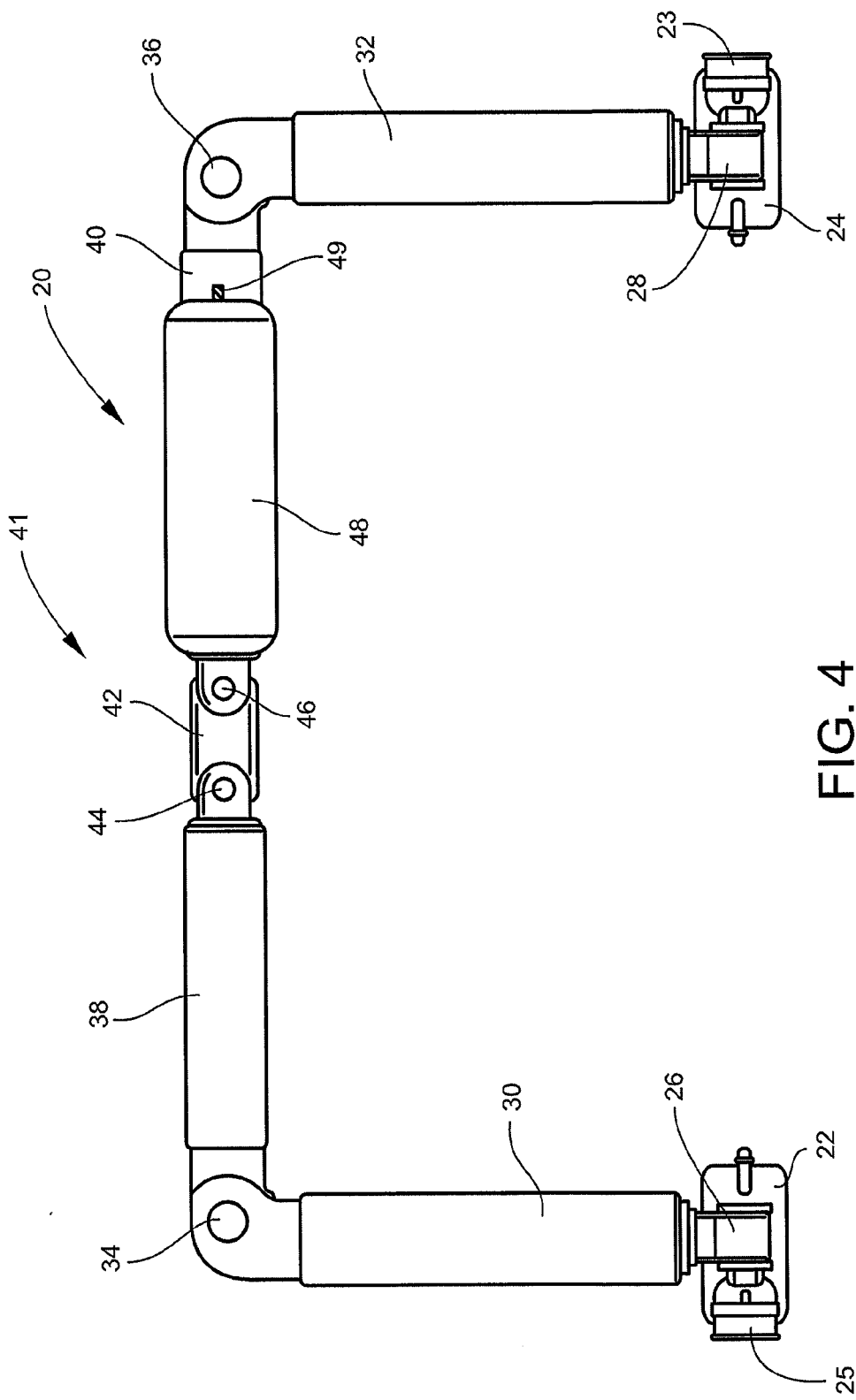
FIG. 4 is a top view of the first embodiment of the inventive handle, in an unlocked and open position.
Figure 6:
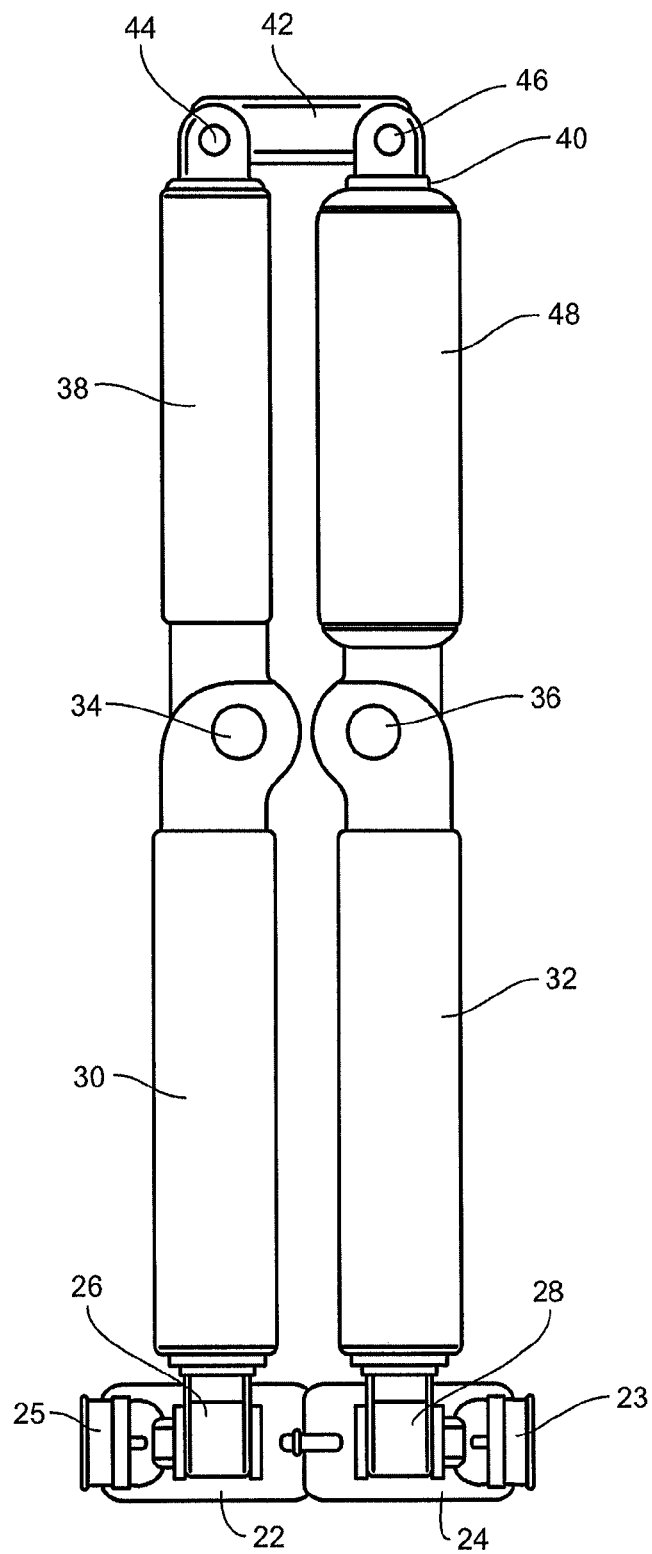
FIG. 6 shows the first embodiment of the inventive handle in an unlocked and collapsed position.

Referring to FIGS. 3 and 4, the handle 20 will be described in greater detail. Handle 20 generally includes; a pair of clamps 22/24; a pair of outer members 30/32; a pair of inner members 38/40; and a lock 41. FIG. 3 shows the handle 20 with the lock 41 engaged (or locked), and FIG. 4 shows the lock 41 disengaged (or unlocked). When the lock is disengaged, the handle may be opened (or expanded), as shown, for example, in FIG. 4, or closed (or collapsed), as shown for example, in FIG. 6. The movement between the opened position and the closed position shall be referred to as a horizontal plane with reference to the lock 41.

Clamps 22/24 are used to engage the handle 20 with the stroller 12, and more specifically with the stroller handles 14/16. Clamps 22/24, as mentioned above, may permanently affix the handle 20 to the stroller 12 or may removeably affix the handle 20 to the stroller 12. Any conventional mechanism may be used for these clamps.

Figure 7:
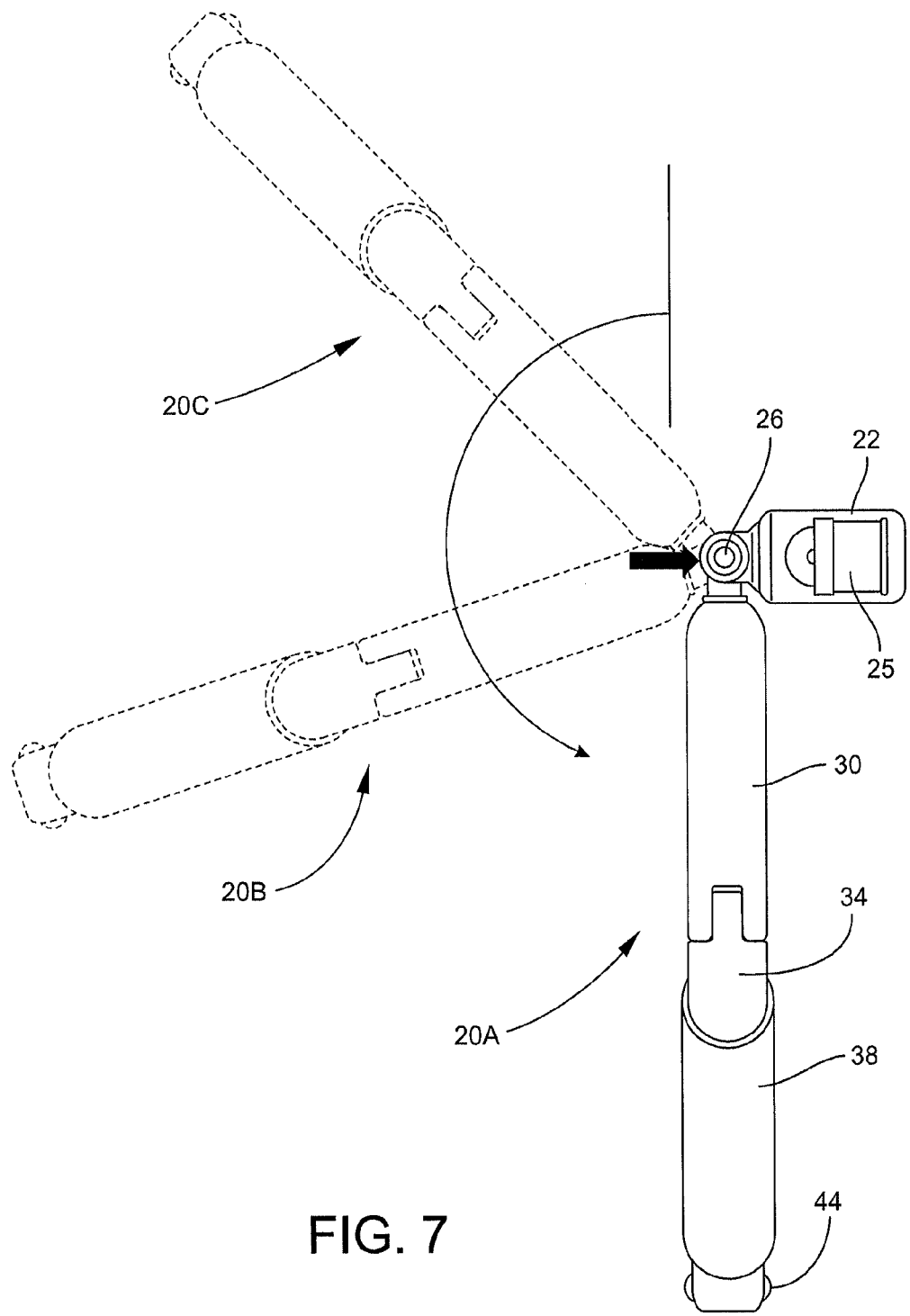
FIG. 7 shows a side view of the first embodiment in a collapsed and stored position (solid lines) and various other (open or in-use) positions (phantom lines).

Outer members 30/32 are pivotally coupled to their respective clamps 22/24 via pivots 26/28. As best illustrated in FIG. 7, pivots 26/28 allow the movement of the handle 20 from a stored (or down) position (shown in solid lines) through various in-use (or up) positions (shown in phantom lines). These up (or in-use) positions may be adjustable, so that users may place the handle 20 at a comfortable operating position. The pivots 26/28 may also include a lock (indicated by the lock handles 23/25) that is used to secure the handle 20 in an in-use or stored positions. This lock may be any conventional locking mechanism. The movement between the stored position and the in-use positions shall be referred to as a vertical plane with reference to the pivots 26/28.

Inner members 38/40 are pivotally coupled to their respective outer members 30/32 via pivots 34/36, and are pivotally coupled to the other inner member (discussed in greater detail below).

In one embodiment, the pivotal coupling between the inner members may include two pivots 44/46 with a plate 42 therebetween, see FIG. 4. In this embodiment, inner member 38 is pivotally coupled to plate 42 via pivot 44, and inner member 40 is pivotally coupled to plate 42 via pivot 46. By use of the plate 42, handle 20 may be more compact in the stored position.

Figure 5:
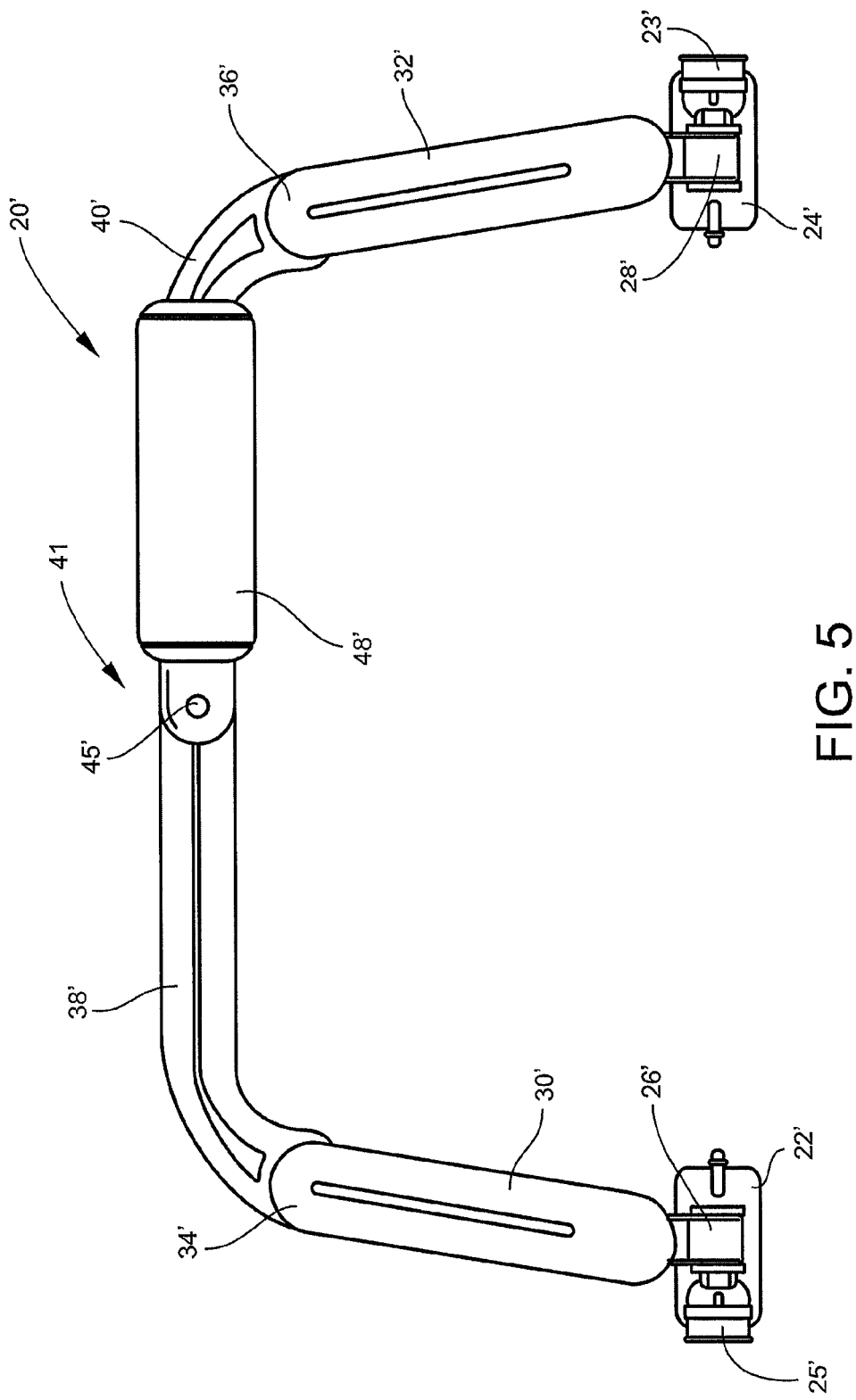
FIG. 5 is a top view of a second embodiment of the inventive handle, in an unlocked and open position.

In another embodiment, the pivotal coupling between the inner members may include a single pivot 45, see FIG. 5. In this embodiment similar elements are designed with an apostrophe on the numeral. In this embodiment, inner member 38' is pivotally coupled to inner member 40' via pivot 45.

The lock 41 is used to fix (or release) the pivots between the inner members 38/40. In FIG. 3, lock 41 is shown in the locked position and in FIGS. 4 and 5, lock 41 is shown in the open (or release or unlocked) position. Lock 41 may be any conventional locking mechanism. In the embodiments shown, lock 41 is illustrated as a slide 48 that travels laterally along one of the inner members and may be guided by a groove 49 and a pin (not shown) fixed to the slide. Slide 48 may have a sleeve-type shape that fits snugly around the inner member and is sufficiently long to traverse the pivotal coupling between the inner members and engage both inner members simultaneously, thereby preventing movement.

In another embodiment (not shown), stroller 10 may have no stroller handles 14/16, More specifically, the inverted 'J' hooks of stroller handles 14/16 are removed, and in their place the handle 20 is affixed (permanently or removeably) between the upwardly extending posts.

The present invention may be embodied in other forms without departing from the spirit and the essential attributes thereof, and, accordingly, reference should be made to the appended claims, rather than to the foregoing specification, as indicating the scope of the invention.

I claim:

1. A handle for a foldable stroller having a pair of stroller handles comprises:
    a foldable bar having lateral ends, the foldable bar includes
    a pair of clamps, each clamp engaging one stroller handle, one clamp is located at each lateral end of the foldable bar,
    a pair of outer members, one end of each outer member pivotally coupled to one of the clamps,
    a pair of inner members, one end of each inner member pivotally engaged with another end of the outer members and another end of each inner member pivotally engaged to the other inner member, and one inner member including a longitudinal groove, and
    a lock disposed at the pivotal engagement between the inner members, the lock including a slide with a pin, the groove guides the pin, and the slide travels along the grooved inner member,
    whereby when the lock is disengaged, the stroller may be freely moved between a collapsed position and an open position, but when the lock is engaged, the stroller is fixed in the open position.

2. The handle of claim 1 wherein each clamp is configured to be permanently affixed to the stroller handle.

3. The handle of claim 1 wherein each clamp is configured to be releasably affixed to the stroller handle.

4. The handle of claim 1 wherein said pivotable coupling between said clamp and said outer member being lockable.

5. The handle of claim 1 wherein said pivotable coupling between said clamp and said outer member allowing the handle to move between a stored position and an open position.

6. The handle of claim 1 wherein said pivotable engagement between said inner members includes two pivots.

7. The handle of claim 1 wherein said pivotable engagement between said inner members includes a plate and two pivots, one pivot coupling one said inner member to said plate, and the other pivot coupling the other said inner member to said plate.

8. The handle of claim 1 wherein said pivotable engagement between said inner members includes a single pivot.

9. A foldable stroller having a pair of stroller handles, wherein the improvement comprises: a handle having
    a foldable bar having lateral ends, the foldable bar includes
    a pair of clamps, each clamp engaging one stroller handle, one clamp is located at each lateral end of the foldable bar,
    a pair of outer members, one end of each outer member pivotally coupled to one of the clamps,
    a pair of inner members, one end of each inner member pivotally engaged with another end of the outer members and another end of each inner member pivotally engaged to the other inner member, and one inner member including a longitudinal groove, and
    a lock disposed at the pivotal engagement between the inner members, the lock including a slide with a pin, the groove guides the pin, and the slide travels along the grooved inner member,
    whereby when the lock is disengaged, the stroller may be freely moved between a collapsed position and an open position, but when the lock is engaged, the stroller is fixed in the open position.

10. The handle of claim 9 wherein each clamp is configured to be permanently affixed to the stroller handle.

11. The handle of claim 9 wherein each clamp is configured to be releasably affixed to the stroller handle.

12. The handle of claim 9 wherein said pivotable coupling between said clamp and said outer member being lockable.

13. The handle of claim 9 wherein said pivotable coupling between said clamp and said outer member allowing the handle to move between a stored position and an open position.

14. The handle of claim 9 wherein said pivotable engagement between said inner members includes two pivots.

15. The handle of claim 14 wherein said pivotable engagement between said inner members includes a plate and two pivots, one pivot coupling one said inner member to said plate, and the other pivot coupling the other said inner member to said plate.

16. The handle of claim 9 wherein said pivotable engagement between said inner members includes a single pivot.

* * * * *